US011951519B2

(12) United States Patent
Brady et al.

(10) Patent No.: US 11,951,519 B2
(45) Date of Patent: Apr. 9, 2024

(54) ELECTROMAGNETIC EXTRUSION

(71) Applicants: Jeremiah John Brady, Knoxville, TN (US); Edward Karl Steinebach, Oakridge, TN (US); Gerard Michael Ludtka, Oakridge, TN (US); MAGNA INTERNATIONAL INC., Aurora (CA)

(72) Inventors: Jeremiah John Brady, Knoxville, TN (US); Edward Karl Steinebach, Oakridge, TN (US); Gerard Michael Ludtka, Oakridge, TN (US)

(73) Assignee: MAGNA INTERNATIONAL INC., Aurora (CA)

(*) Notice: Subject to any disclaimer, the term of this patent is extended or adjusted under 35 U.S.C. 154(b) by 0 days.

(21) Appl. No.: 16/771,389

(22) PCT Filed: Aug. 31, 2018

(86) PCT No.: PCT/US2018/049087
§ 371 (c)(1),
(2) Date: Jun. 10, 2020

(87) PCT Pub. No.: WO2019/118018
PCT Pub. Date: Jun. 20, 2019

(65) Prior Publication Data
US 2020/0391265 A1 Dec. 17, 2020

Related U.S. Application Data

(60) Provisional application No. 62/552,893, filed on Dec. 15, 2017.

(51) Int. Cl.
*B21C 23/21* (2006.01)
*B21C 23/03* (2006.01)
(Continued)

(52) U.S. Cl.
CPC ............. *B21C 23/03* (2013.01); *B21C 23/04* (2013.01); *B21C 23/20* (2013.01); *B21C 23/212* (2013.01); *B21C 27/00* (2013.01); *B21C 29/02* (2013.01)

(58) Field of Classification Search
CPC ...... B22F 3/20; B22F 3/204; B22F 2003/202; B22F 2003/208; B22F 2202/05
See application file for complete search history.

(56) References Cited

U.S. PATENT DOCUMENTS 2,870,907 A * 1/1959 Creutz .................... B21C 25/00
72/271
3,060,560 A * 10/1962 Biehl ...................... B21C 23/20
428/602
(Continued)

FOREIGN PATENT DOCUMENTS

CN 1422710 A 6/2003
CN 105499292 A * 4/2016 ........... B21C 23/001
(Continued)

OTHER PUBLICATIONS

CN 106653266 A, Machine Translation, 2017 (Year: 2017).*
(Continued)

*Primary Examiner* — Bobby Yeonjin Kim
*Assistant Examiner* — Jared O Brown
(74) *Attorney, Agent, or Firm* — Dickinson Wright PLLC

(57) ABSTRACT

A system and method for an improved material flow through an extrusion machine by altering the material properties in a magnetic field are provided. The electromagnetic extrusion system includes a ram that is moved into a chamber containing an extrusion material to force the extrusion material out of an opening defined, at least in part, by a die to create an extrusion with a cross-sectional shape corresponding to the predetermined shape of the opening. An electromagnetic winding of electrically conductive material is embedded (Continued)

within a tool retainer block surrounding the container and is helically wound about the chamber and carries a DC electrical current to generate a magnetic field having a magnetic flux density of at least 2 Tesla within the extrusion material to dissipate dislocation defect structures in the extrusion material being extruded via the magnetoplasticity effect. The magnetic field therefore provides for reduced flow stress on the tooling.

15 Claims, 3 Drawing Sheets

(51) Int. Cl.
*B21C 23/04* (2006.01)
*B21C 23/20* (2006.01)
*B21C 27/00* (2006.01)
*B21C 29/02* (2006.01)

(56) References Cited

U.S. PATENT DOCUMENTS

| | | | | |
|---|---|---|---|---|
| 3,668,748 A | | 6/1972 | Divecha et al. | |
| 3,774,890 A | * | 11/1973 | Lemelson | B21C 23/085 425/77 |
| 3,874,207 A | * | 4/1975 | Lemelson | B21C 29/006 72/56 |
| 3,928,995 A | | 12/1975 | Oldis et al. | |
| 3,946,794 A | | 3/1976 | Rakestraw | |
| 4,304,537 A | | 12/1981 | Kirjavainen et al. | |
| 4,346,578 A | * | 8/1982 | Harrison | B21C 23/218 72/253.1 |
| 5,360,329 A | * | 11/1994 | Lemelson | F28F 19/02 425/143 |
| 6,138,355 A | | 10/2000 | Grassi | |
| 2002/0189313 A1 | * | 12/2002 | Plata | B21J 5/004 72/272 |
| 2014/0225467 A1 | * | 8/2014 | Munz | H02K 49/108 310/101 |
| 2017/0125163 A1 | * | 5/2017 | Pinkerton | B21C 23/12 |

FOREIGN PATENT DOCUMENTS

| | | | | |
|---|---|---|---|---|
| CN | 105499292 A | | 4/2016 | |
| CN | 106653266 A | * | 5/2017 | B21C 23/002 |
| GB | 2022001 A | * | 12/1979 | C04B 35/63448 |
| GB | 2022001 A | | 12/1979 | |
| JP | S56120012 A | | 9/1981 | |
| WO | 2014043816 A1 | | 3/2014 | |
| WO | 2016089097 A1 | | 6/2016 | |

OTHER PUBLICATIONS

CN 105499292 A, Machine Translation, 2016 (Year: 2016).*
Supplementary European Search Report Issued in EP Application No. 18889363, dated Aug. 5, 2020.
Molotskii, M., et al.; Magnetic effect in electroplasticity of metals; Physical Review B; Dec. 1, 1995—II; 6 pgs.; vol. 52, No. 22; The American Physical Society; 1995.
Wang, X., et al.; Modeling of thermal and mechanical behavior of a magnesium alloy AZ31 during electrically-assisted micro-tension; International Journal of Plasticity; 2016; pp. 230-257.
Search Report issued in CN application No. 201880080141.5, dated Jun. 17, 2021.
Search Report regarding corresponding CN App. No. 201880080141.5; dated Feb. 24, 2022.
Aluminum Alloy Tube, Rod, Wire Production Technology, WEI Changchuan et al., Beijing: Metallurgical Industry Press, pp. 50-51, published in Mar. 2013, cited in Office Action dated Feb. 24, 2022 in corresponding Chinese Patent application No. 201880080141.5 for its purported relevance to Claims 1-9 and for its description regarding: "typical solid billet piercing backward extrusion for pipes".

* cited by examiner

ELECTROMAGNETIC EXTRUSION

CROSS REFERENCE TO RELATED APPLICATION

This U.S. National Stage Patent Application claims the benefit of PCT International Patent Application Serial No. PCT/US2018/049087 filed Aug. 31, 2018 entitled "Electromagnetic Extrusion" which claims the benefit of U.S. Provisional Patent Application Ser. No. 62/552,893 filed Dec. 15, 2017 entitled "Electromagnetic Extrusion," the entire disclosures of the applications being considered part of the disclosure of this application and hereby incorporated by reference.

GOVERNMENT LICENSE RIGHTS

This invention was made under Department of Energy (DOE) Contract No. DE-AC05-00OR22725 between Magna International Inc. and UT-Battelle, LLC, operating and management Contractor for the Oak Ridge National Laboratory for the United States Department of Energy. The Government has certain rights in this invention.

BACKGROUND

1. Field of the Invention

The present disclosure relates generally to a system and method for an improved material flow through an extrusion machine by altering the material properties of an extrusion material in a magnetic field.

2. Related Art

This section provides background information related to the present disclosure that is not necessarily prior art.

Extrusion is the processes of shaping material, such as plastic, metal, alloys, or billets, by pushing the material through a shaped opening in a die. Material pushed through the die exits the die as an elongated piece of material with the same shape as the die opening. The extrusion process for metal, such as an aluminum billet, is used to mass produce straight, semi-finished products. High-strength aluminum products are used, for example, in the automotive industry and must have consistent material properties (e.g., microstructural and mechanical properties) throughout its entirety. However, the material properties of the products can be affected by the extrusion process, resulting in an inferior product. For example, a solid cross section or a hollow cross section of an aluminum product can be produced by indirect extrusion; however, manufacturing conditions can cause recrystallization on a long side of a billet when homogenizing treatment temperature conditions or/and a high extrusion temperature allows for intermetallic compounds of these elements to grow. Additionally, the tooling itself can be damaged from the extrusion process.

It has been shown that an applied magnetic field can change the plastic behavior of crystalline materials, a phenomenon known as magnetoplasticity. The magnetoplasticity phenomenon has been explained by assuming that a dangling bond of a paramagnetic impurity forms a radical pair with a dangling bond of the dislocation core. It has been shown that an applied magnetic field can induce transitions between different spin states of such pairs characterized by different binding energies, and thus facilitate dislocation depinning from the impurity, which thereby enhances the crystal plasticity.

SUMMARY

This section provides a general summary of the present disclosure and is not a comprehensive disclosure of its full scope or all of its features, aspects, and objectives. An electromagnetic extrusion system is provided for extruding a material. The electromagnetic extrusion system comprises a container defining a chamber for holding the extrusion material, and a die defining an opening in fluid communication with the chamber for the extrusion material to exit as an extrusion. The subject electromagnetic extrusion system also includes an electromagnetic winding disposed about the chamber, which is configured to carry an electrical current to generate a magnetic field to reduce flow stress of the extrusion material.

The electromagnetic extrusion system may also include a ram configured to push the extrusion material out of the opening.

According to an aspect of the disclosure, the electromagnetic extrusion system may be provided with the container having a cup shape with a tubular side wall defining an inner surface and extending in an axial direction from a solid base. The die may be configured to move with the ram through the chamber, and with the opening extending between an outer surface of the die and the inner surface of the tubular side wall of the chamber.

According to an aspect of the disclosure, the electromagnetic extrusion system may be provided with the container including a tubular side wall extending from a first end that is open to receive the ram, and with the die fixed relative to the container and disposed at a second end of the tubular side wall opposite first end. The die may be located adjacent to and outside of the container, as shown in FIG. 2.

According to an aspect of the disclosure, the electromagnetic winding may be helically wound about the chamber. According to another aspect, the electromagnetic winding may be configured to produce a magnetic flux density of at least 2 Tesla within the extrusion material. According to another aspect, the electrical current in the electromagnetic winding may be direct current.

According to an aspect of the disclosure, at least one of the container or the die may comprise a ferromagnetic material configured to intensify the magnetic flux within the extrusion material. According to another aspect of the disclosure a tool retainer block containing the electromagnetic winding may surround the container.

According to another aspect of the disclosure, the extrusion material is a metal. According to yet another aspect of the disclosure, the magnetic field dissipates a dislocation defect structure within the extrusion material using a magnetoplasticity effect.

A method of operating an extrusion system is also provided in the present disclosure. The method includes: forcing an extrusion material to exit a chamber through an opening; energizing an electromagnetic winding disposed about the chamber to produce a magnetic field in the extrusion material; and reducing flow stress in the extrusion material by the magnetic field in the extrusion material.

The step of energizing an electromagnetic winding disposed about the chamber includes may include passing a DC electrical current through the electromagnetic winding. According to an aspect of the disclosure, the magnetic field may have a magnetic flux density of at least 2 Tesla within the extrusion material. According to another aspect of the disclosure, the extrusion material is maintained in a solid state.

In summary, a system and method of extrusion that utilizes electromagnetic energy to improve material flow through an extrusion machine by altering material properties of an extrusion material being extruded.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 3 is a flow chart listing steps in a method for

DETAILED DESCRIPTION

In general, extrusion systems, which may also be called extrusion machines, are used to produce semi-finished metal products. In particular, extrusion systems generally apply pressure to force an extrusion material through an opening 34 having a predetermined shape to create an extrusion 12 with a cross-sectional shape corresponding to the predetermined shape of the opening 34.

Figure 1:
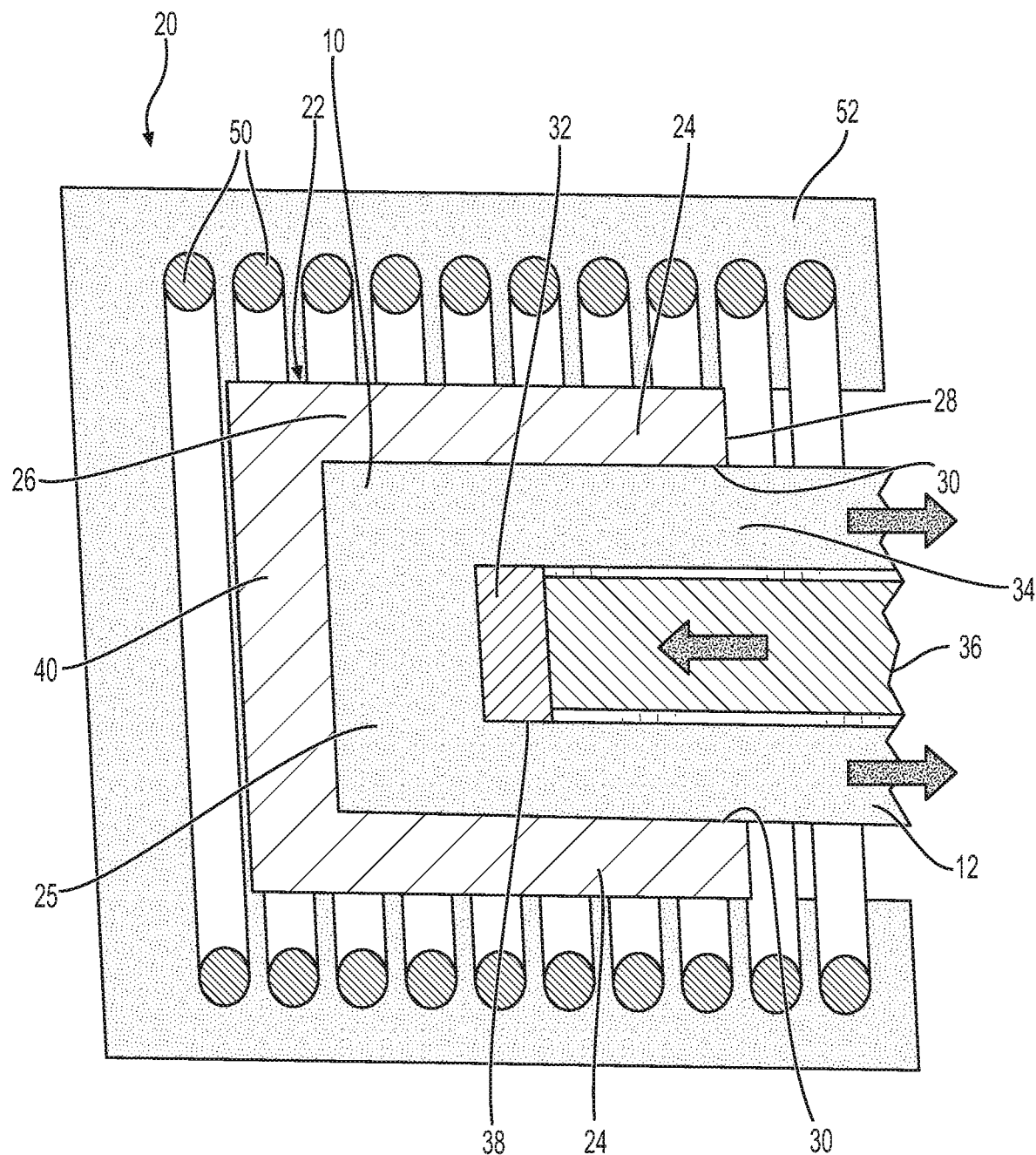
FIG. 1 is a cross-sectional diagram of an electromagnetic extrusion system of the present disclosure.

FIG. 1 illustrates an electromagnetic extrusion system 20 according to the present disclosure. In particular, it illustrates an electromagnetic extrusion system 20 configured to create an extrusion 12 that is hollow, such as a extrusion of a hollow part (i.e., a hollow extrusion with a cavity) that utilizes electromagnetic energy to improve material flow through the electromagnetic extrusion system 20 by altering material properties of a billet 10 in a magnetic field. In an example embodiment, the extrusion material is in the form of a solid block, also called a billet 10 and which is made of a metal such as aluminum or steel or an alloy containing two or more metallic elements.

The electromagnetic extrusion system 20 includes a container 22 having a tubular side wall 24 extending between a first end 26 and a second end 28 and defining an inner surface 30 to enclose a chamber 25 for holding the billet 10 of the extrusion material. The extrusion system 20 also includes a die 32 defining an opening 34 in fluid communication with the chamber 25 for the extrusion material to exit therefrom as the extrusion 12.

As shown in FIG. 1, the container 22 has a cup shape with the tubular side wall 24 extending in an axial direction from a solid base 40 enclosing the first end 26. As indicated by the arrows, the die 32 is driven in a straight line by a ram 36 into the chamber 25 and to thereby cause the extrusion material of the billet 10 to deform and to be extruded in a direction opposite the direction of travel of the ram 36. In other words, the die 32 moves with the ram 36 through the chamber 25 to push the extrusion material out of the opening 34 as an extrusion 12, which thereby takes the shape of the opening 34 defined by the space between the inner surface 30 of the tubular side wall 24 and an outer surface 38 of the die 32. The ram 36 may apply large amount of force to the billet 10 and may be driven, for example, by a hydraulic cylinder (not shown in the Figures).

An electromagnetic winding 50 of electrically conductive material, is embedded within a tool retainer block 52 surrounding the container 22. The electromagnetic winding may be a traditional resistance-type electromagnet, such as a Bitter electromagnet or a helical coil of wire, such as copper. Alternatively, the electromagnetic winding 50 may be a superconducting magnet and which must be cryocooled to remain in a superconducting state with zero resistance.

Figure 2:
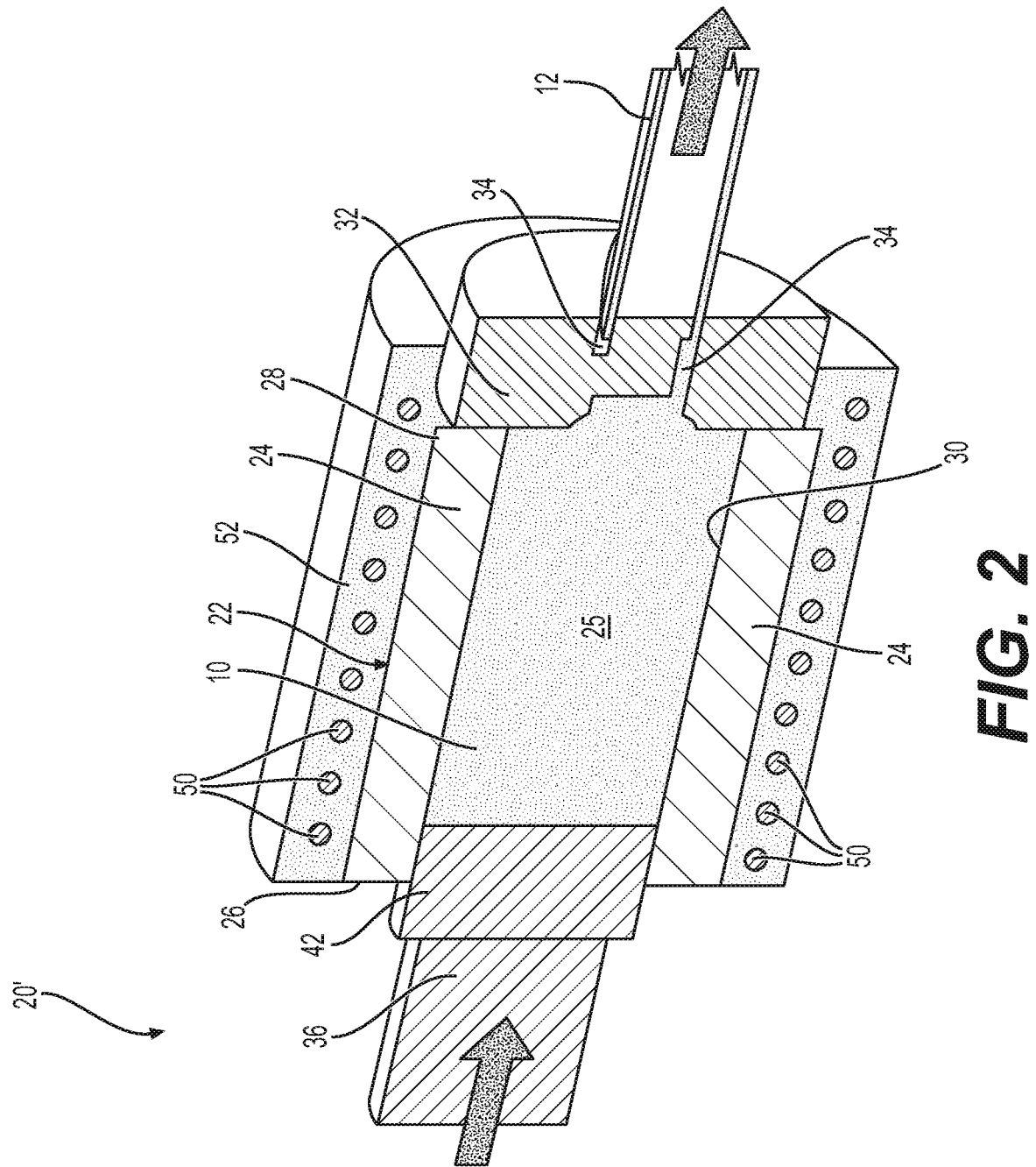
FIG. 2 is a cross-sectional diagram of another embodiment of an electromagnetic extrusion system of the present disclosure.

The electromagnetic winding 50 may be a different material or construction, such as a hollow tube configured to carry a cooling fluid. As shown in the examples of FIGS. 1 and 2, the electromagnetic winding 50 is helically wound about the chamber 25 and is configured to carry an electrical current to generate a magnetic field having a magnetic flux density of at least 2 Tesla within the extrusion material to reduce flow stress of the extrusion material. The electromagnetic winding 50 is therefore configured as a solenoid. The electrical current is preferably a direct current (DC) electrical current, as an AC electrical current would function as an induction heating coil, causing undesirable induction heating in the tooling and in the extrusion material.

One or both of the container 22 and/or the die 32 may comprise a ferromagnetic material, such as Fe, Ni, or Co alloys, which function to intensify the magnetic field within the extrusion material. The magnetic flux density B of a solenoid in free space is described by equation 1:

$$B = \mu_0 \frac{NI}{l}.$$

where $\mu_0$ is the magnetic constant, $1.25663706 \times 10^{-6}$ m kg $s^{-2}$ $A^{-2}$, N is the number of turns, I is the electrical current (in Amps), and l is the length of the loop. For a solenoid immersed in a material with relative permeability $\mu_r$, such as the in the electromagnetic extrusion system 20 disclosed herein, the magnetic flux density B is described by equation 2:

$$B = \mu_0 \mu_x \frac{NI}{l}.$$

In other words, the magnetic field generated by the solenoid is intensified by the ferromagnetic material, which has a high relative permeability. For example, a magnet design that normally provides a magnetic flux density B of 0.2 T could potentially achieve a magnetic field density B of 1.2 T by saturating the ferromagnetic material within the electromagnetic winding 50. In other words, by making the tooling, such as the container 22, and/or the die 32 of ferromagnetic material, the magnetic field in the extrusion material may be intensified.

FIG. 2 illustrates an alternative arrangement in which the container 22 is formed as an open tube with the tubular side wall 24 extending from a first end 26 that is open to receive the ram 36, and where the die 32 is fixed relative to the container 22 and is disposed at a second end 28 of the tubular side wall 24 opposite first end 26. As indicated by the arrows, the ram 36 is moved axially into the chamber 25 to force the extrusion material out of the opening 34 in the die 32 as the extrusion 12. The ram 36 includes a plunger head 42 which sealingly engages the inner surface 30 of the tubular side wall 24 of the chamber 22. The plunger head 42 therefore prevents the extrusion material from exiting rearwardly from the chamber 25 around the ram 36 as the ram is moved into the chamber 25 in the extrusion process.

In the example configuration shown in FIG. 2, the die 32 defines the entire opening 34 through which the extrusion material is pushed as the extrusion 12. This configuration may be best suited, for example, to extrusions 12 having a solid cross-section.

In summary, the system of the present disclosure provides for flow stress of the extrusion material to be reduced because the magnetic field allows the extrusion material to recrystallize with an improved dynamic recovery rate. The dynamic recovery rate is improved because the magnetic field dissipates the dislocation defect structure via the magnetoplasticity effect. In other words, the flow stress on tooling, such as the chamber 22 and the die 32 and the ram 36, is reduced because the alteration of the material properties in the magnetic field improves the flow of the extrusion material through the electromagnetic extrusion system 20, which reduces pressure on the tooling. In other words, the net effect of the magnetoplasticity effect in the is the enablement of more uniform deformation to produce more complex extrusion shapes or a reduction in the material flow stress allowing for lower extrusion press loads which can increase tooling life or facilitate making extrusions using existing, lower tonnage forming presses for a particular application.

Because the billet 10 remains stationary in relation to the container 22, friction loss and resulting heat is kept to a minimum. The temperature required for operation of the extrusion system 20 is low enough to suppress surface coarsening of crystal grains on the extrusion 12, which results in the finished product having fewer impurities. Additionally, the processing time using this process is faster than other extrusion processes, and therefore, allows for increased production.

Figure 3:
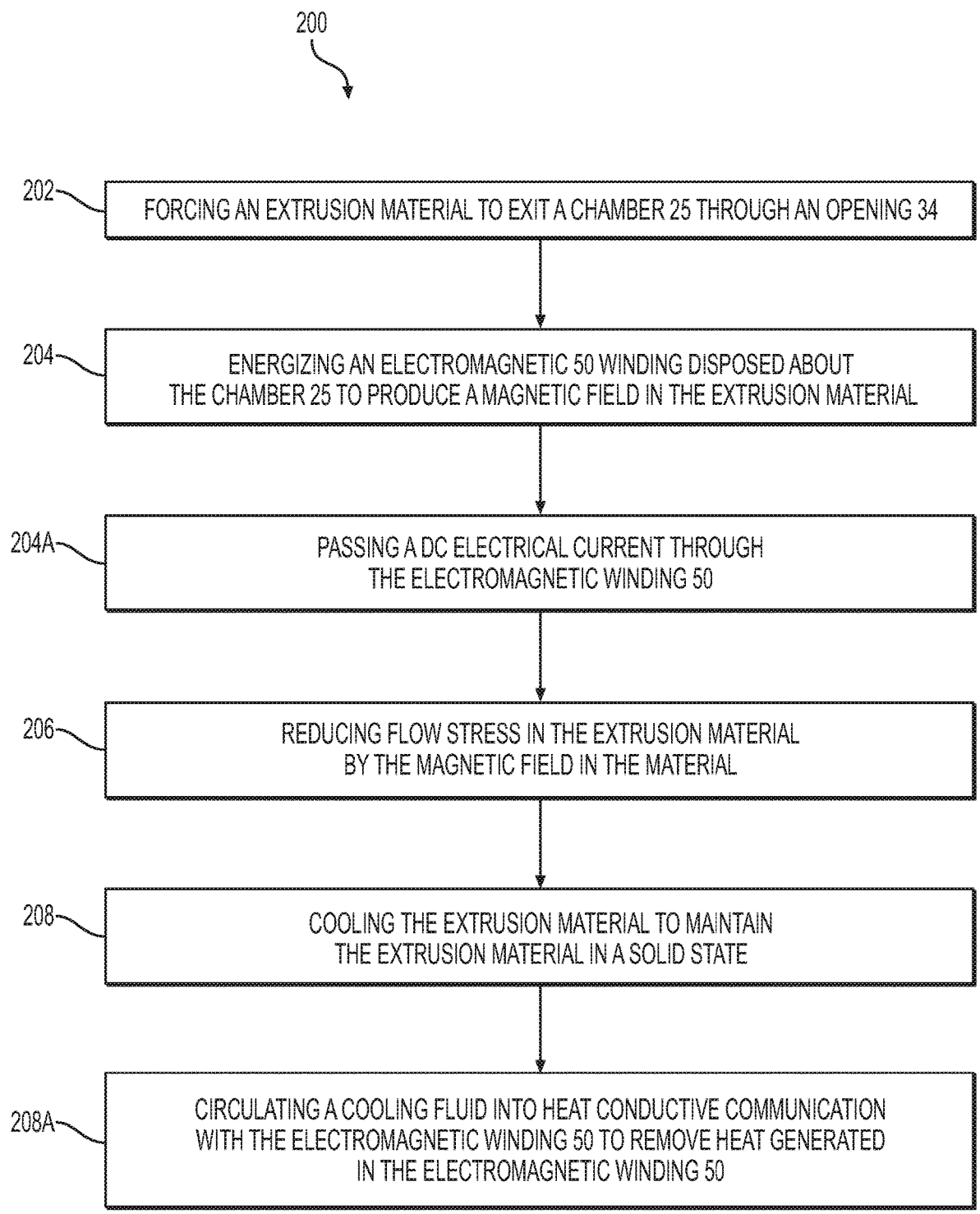

As described in the flow chart of FIG. 3, a method 200 method of operating an extrusion system 20 is also provided. The method 200 includes forcing an extrusion material to exit a chamber 25 through an opening 34 at step 202. This step 202 may be performed, for example, by the motion of a ram 36 into the chamber 25 to displace a billet 10 of solid material contained therein and to force the extrusion material through an opening 34 that is defined, at least in part, by a die 32.

The method 200 also includes energizing an electromagnetic winding 50 disposed about the chamber FIG. 25 to produce a magnetic field in the extrusion material at step 204. The electromagnetic winding 50 is preferably formed as a solenoid including an electrical conductor helically wound about the chamber 25. This step 204 may include passing a DC electrical current through the electromagnetic winding 50 at substep 204A. A DC electrical current is preferred, although an AC current may be used provided that the frequency of the AC current is chosen to minimize induction heating and to avoid melting the extrusion material. Also, DC magnetic fields resulting from the DC electrical current are more effective because they are able to penetrate the entire conductive extrusion material. AC fields, on the other hand, have a rather shallow skin depth, limiting the penetration depth into the surface of the extrusion material.

The method 200 also includes reducing flow stress in the extrusion material by the magnetic field in the material at step 206. This step utilizes the magnetoplasticity effect, by which a material is altered by dissipating dislocation defect structures by a strong magnetic field. The magnetic field preferably has a magnetic flux density of at least 2 Tesla in the extrusion material, although the reduction in the flow stress may depend on other factors such as, for example, the composition of the extrusion material, the temperature, and the pressure applied to the extrusion material.

The method 200 also includes cooling the extrusion material to maintain the extrusion material in a solid state at step 208. In order to take full advantage of the magnetoplasticity effect, the extrusion material is preferably maintained at a temperature where in remains a solid. The electromagnetic winding 50 will generate heat through joule heating, which is described by the equation $P=I^2R$, where P is the power dissipated as heat (in Watts), I is the electrical current (in Amps), and R is the resistance of the electromagnetic winding 50 (in Ohms). Because the electromagnetic winding 50 may carry a substantial amount of electrical current, the joule heating may also be substantial. Step 208 may include circulating a cooling fluid into heat conductive communication with the electromagnetic winding 50 to remove heat generated in the electromagnetic winding 50 at sub-step 208A. The cooling fluid may be a liquid or a gas and may be, for example, a coolant that is circulated through passages in the tool retainer block 52 and/or through the electromagnetic winding 50 itself. The cooling fluid may be cooled to remove the excess heat by traditional means, such as an evaporative cooling system, one or more heat exchangers, and/or using one or more chillers to transfer heat using phase changes of a refrigerant.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electromagnetic extrusion system for extruding an extrusion material, comprising:

a container defining a chamber for holding the extrusion material, wherein the container has a cup shape with a tubular side wall defining an inner surface and extending in an axial direction from a solid base;

a die located adjacent to and outside of the container and defining an opening in fluid communication with the chamber for the extrusion material to exit therefrom as an extrusion;

a ram configured to push the extrusion material out of the opening; and an electromagnetic winding disposed about both of the chamber and the die located outside of the container and configured to carry an electrical current to generate a magnetic field to reduce flow stress of the extrusion material, wherein the die comprises a ferromagnetic material configured to intensify the magnetic field within the extrusion material, and wherein the die is configured to move with the ram through the chamber with the opening extending between an outer surface of the die and the inner surface of the tubular side wall of the chamber.

2. The electromagnetic extrusion system of claim 1, wherein the electromagnetic winding is helically wound about both of the chamber and the die.

3. The electromagnetic extrusion system of claim 1, wherein the electromagnetic winding is configured to produce a magnetic flux density of at least 2 Tesla within the extrusion material.

4. The electromagnetic extrusion system of claim 1, wherein the electrical current is direct current.

5. The electromagnetic extrusion system of claim 1, wherein the ferromagnetic material includes an alloy comprising at least one of Iron, Nickel, and Cobalt.

6. The electromagnetic extrusion system of claim 1, further comprising a tool retainer block surrounding the container; and
   wherein the electromagnetic winding is disposed within the tool retainer block.

7. The electromagnetic extrusion system of claim 1, wherein the magnetic field dissipates a dislocation defect structure within the extrusion material using a magnetoplasticity effect.

8. The electromagnetic extrusion system of claim 1, wherein the extrusion material is aluminum or an alloy in which aluminum is the predominant metal.

9. A method of operating an extrusion system, comprising:
   forcing, by a ram, an extrusion material to exit a chamber of a container and through an opening defined by a die, wherein the extrusion material is aluminum or an alloy in which aluminum is the predominant metal, wherein the container has a cup shape with a tubular side wall defining an inner surface and extending in an axial direction from a solid base;
   energizing an electromagnetic winding disposed about both of the chamber and the die to produce a magnetic field in the extrusion material; and
   reducing flow stress in the extrusion material by the magnetic field in the extrusion material;
   wherein the die is located outside of the container and comprises a ferromagnetic material configured to intensify the magnetic field within the extrusion material, and
   wherein the electromagnetic winding is disposed about both of the chamber and the die located outside of the container, and
   wherein the die is configured to move with the ram through the chamber with the opening extending between an outer surface of the die and the inner surface of the tubular side wall of the chamber.

10. The method of operating an extrusion system of claim 9, wherein the step of energizing the electromagnetic winding disposed about the chamber includes passing a DC electrical current through the electromagnetic winding.

11. The method of operating an extrusion system of claim 9, wherein the magnetic field has a magnetic flux density of at least 2 Tesla within the extrusion material.

12. The method of operating an extrusion system of claim 9, wherein the step of reducing flow stress in the extrusion material includes maintaining the extrusion material in a solid state.

13. An electromagnetic extrusion system for extruding an extrusion material, comprising:
   a container defining a chamber for holding the extrusion material, wherein the container has a cup shape with a tubular side wall defining an inner surface and extending in an axial direction from a solid base;
   a die located adjacent to and outside of the container and defining an opening in fluid communication with the chamber for the extrusion material to exit therefrom as an extrusion;
   a ram configured to push the extrusion material out of the opening;
   a tool retainer block disposed annularly around the chamber; and
   an electromagnetic winding embedded within the tool retainer block, wherein the electromagnetic winding is helically wound about both of the chamber and the die located outside of the container and configured to carry an electrical current to generate a magnetic field to reduce flow stress of the extrusion material,
   wherein the die is configured to move with the ram through the chamber with the opening extending between an outer surface of the die and the inner surface of the tubular side wall of the chamber.

14. The electromagnetic extrusion system of claim 13, wherein the die comprises a ferromagnetic material configured to intensify the magnetic field within the extrusion material.

15. The electromagnetic extrusion system of claim 13, wherein the extrusion material is aluminum or an alloy in which aluminum is the predominant metal.

* * * * *